US010425156B1

(12) United States Patent
Zeng et al.

(10) Patent No.: US 10,425,156 B1
(45) Date of Patent: Sep. 24, 2019

(54) DYNAMICALLY DETERMINING OPTICAL TRANSCEIVER EXPECTED LIFE

(71) Applicant: Facebook, Inc., Menlo Park, CA (US)

(72) Inventors: WenSheng Zeng, Fremont, CA (US); Abhijit Chakravarty, Fremont, CA (US); Matthew Peter Kelly, Palo Alto, CA (US); Edward Galley, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/941,472

(22) Filed: Mar. 30, 2018

(51) Int. Cl.
H04B 10/079 (2013.01)
H04B 10/077 (2013.01)
H04B 10/43 (2013.01)

(52) U.S. Cl.
CPC ... H04B 10/07955 (2013.01); H04B 10/0775 (2013.01); H04B 10/0793 (2013.01); H04B 10/43 (2013.01); H04B 2210/071 (2013.01)

(58) Field of Classification Search
CPC .......... H04B 10/07955; H04B 10/0775; H04B 10/0793
USPC ....................................... 398/37, 9
See application file for complete search history.

(56) References Cited

U.S. PATENT DOCUMENTS

| 5,265,110 | A | * | 11/1993 | Naya | ...................... | H01S 5/0687 372/21 |
| 5,673,282 | A | | 9/1997 | Wurst | | |
| 6,317,231 | B1 | | 11/2001 | Al-Salameh | | |
| 6,524,016 | B1 | * | 2/2003 | Ohki | ...................... | H01S 5/146 385/88 |
| 6,618,811 | B1 | | 9/2003 | Berthaud | | |
| 2004/0164935 | A1 | | 8/2004 | Dedene | | |
| 2004/0196354 | A1 | | 10/2004 | Hansen | | |
| 2005/0007908 | A1 | * | 1/2005 | Yonemitsu | ........... | G11B 7/1267 369/47.5 |
| 2006/0036515 | A1 | * | 2/2006 | Ingalsbe | .............. | G06Q 10/087 705/28 |
| 2006/0062116 | A1 | * | 3/2006 | Ishibashi | .............. | H04B 10/564 369/47.35 |
| 2007/0195847 | A1 | | 8/2007 | Fukamachi | | |
| 2008/0165635 | A1 | | 7/2008 | Bakx | | |
| 2009/0192735 | A1 | * | 7/2009 | Horiuchi | ............... | H01S 5/0021 702/58 |
| 2011/0019183 | A1 | * | 1/2011 | Ukon | ...................... | G01J 3/108 356/51 |
| 2013/0051425 | A1 | * | 2/2013 | Huang | ................... | G01K 1/022 374/141 |
| 2013/0121683 | A1 | * | 5/2013 | Nagamine | ........... | H04L 41/0677 398/2 |
| 2013/0223472 | A1 | * | 8/2013 | Maston | .................. | G01K 15/00 374/2 |
| 2014/0281479 | A1 | | 9/2014 | Gettings | | |

(Continued)

Primary Examiner — Oommen Jacob
(74) Attorney, Agent, or Firm — Van Pelt, Yi & James LLP

(57) ABSTRACT

The amount of current provided to a laser diode of an optical network transceiver device, the power output of the optical network transceiver device, and the device temperature of the optical network transceiver device is monitored. Based at least in part on a detected fluctuation in at least one of the amount of current provided to the laser diode, the power output of the optical network transceiver device, and the device temperature of the optical network transceiver device, a determined expected life of the optical network transceiver device is dynamically adjusted.

20 Claims, 5 Drawing Sheets

(56) References Cited

U.S. PATENT DOCUMENTS

| | | | |
|---|---|---|---|
| 2015/0022181 A1* | 1/2015 | Anderson | H04Q 9/00 324/114 |
| 2015/0092801 A1* | 4/2015 | Jensen | H01S 3/09415 372/32 |
| 2015/0379853 A1* | 12/2015 | Gallo | H04W 4/12 340/600 |
| 2016/0253415 A1* | 9/2016 | Zhong | G06F 11/0721 707/722 |
| 2017/0109589 A1 | 4/2017 | Van Gorp | |
| 2017/0279246 A1 | 9/2017 | Muendel | |

* cited by examiner

DYNAMICALLY DETERMINING OPTICAL TRANSCEIVER EXPECTED LIFE

BACKGROUND OF THE INVENTION

Large datacenters typically utilize numerous high-speed optical transceivers in a network environment. In the event of a network fault, such as a downed link, the network is analyzed and the source of the fault is identified. Typically, the source is identified by systematically eliminating different potential causes. In some cases, the fault is due to a failed optical network transceiver device. However, definitively determining that a faulty optical transceiver is the source of the problem can be laborious and time consuming. Moreover, while troubleshooting is being performed, the network functionality is compromised due to the downed network link. Therefore, there exists a need to reduce the network downtime by dynamically adjusting the determined expected life of an optical network transceiver device. Based on the expected life of the device, an optical network transceiver device can be proactively replaced before it fails.

BRIEF DESCRIPTION OF THE DRAWINGS

Various embodiments of the invention are disclosed in the following detailed description and the accompanying drawings.

DETAILED DESCRIPTION

Figure 1:
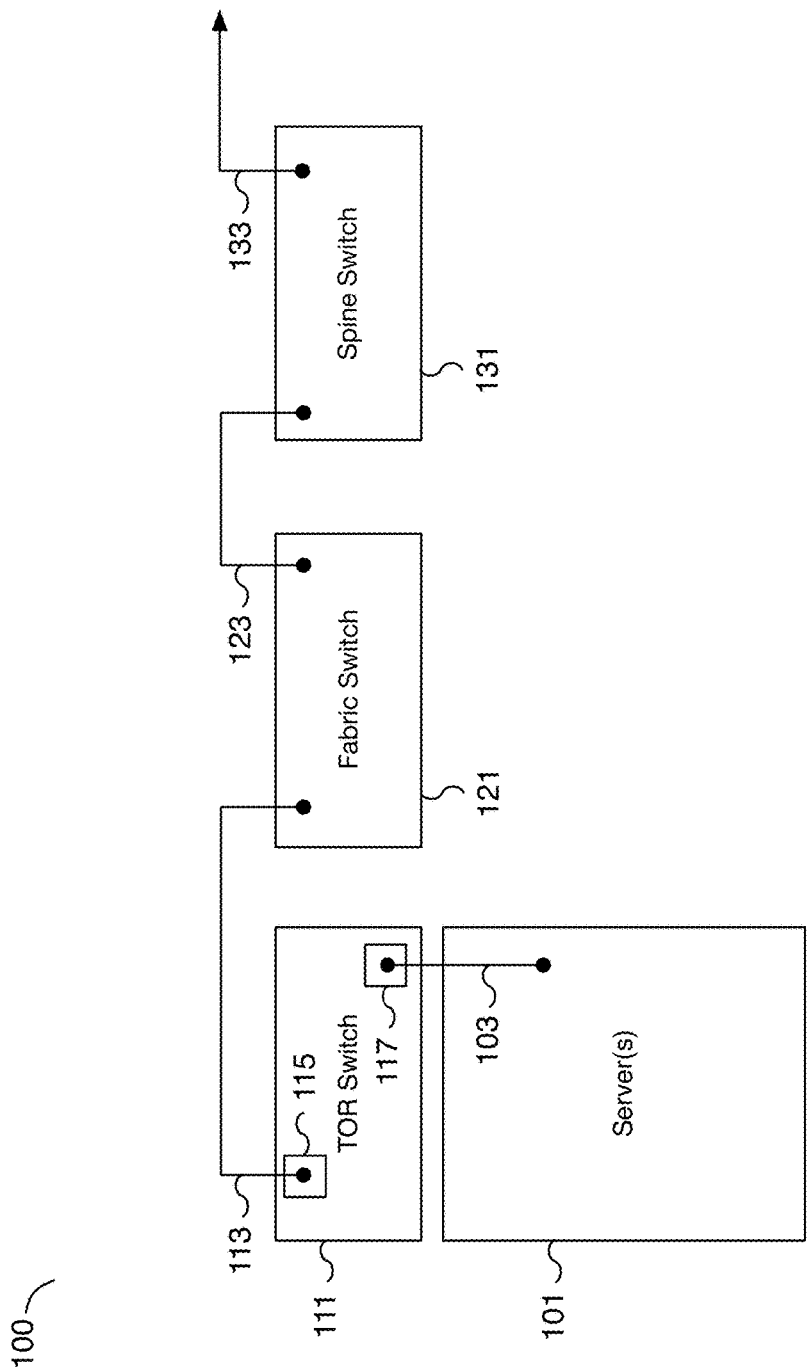
FIG. 1 is a block diagram illustrating an example of a network environment for predicting the failure of an optical network transceiver device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically determining the expected life of an optical network transceiver device is disclosed. For example, by monitoring the amount of current, power output, and device temperature of an optical network transceiver device for fluctuations, the expected life of the device can be dynamically adjusted. Once the expected life can be determined, a soon-to-fail device can be identified and proactively replaced. By preemptively replacing a working but soon-to-fail optical network transceiver device, the network downtime is reduced significantly compared to allowing the device to fail and performing the troubleshooting necessary to identify the device as the cause of the network fault.

In various embodiments, the operating current, power output, and temperature of an optical transceiver are monitored. For example, a laser diode operates at a particular current to transmit an optical signal with a particular power output at a certain temperature. In some embodiments, the amount of current provided to a laser diode of an optical network transceiver device is monitored. When transmitting an optical signal, the monitoring of the operating current may detect that the current fluctuates over time and may reach a threshold limit indicating a lower expected life. In some embodiments, the device is monitored to detect for the operating current of the laser diode reaching a threshold limit such as the saturation current limit.

In addition to monitoring current, the power output of the optical network transceiver device is monitored. For example, the power output can be monitored by using power monitoring hardware of the optical network transceiver device such a tap monitor powering module. The power output can be monitored to determine whether the power output is stable and is operating near the beginning-of-life (BOL) power output level. In some scenarios, the power output does not stabilize and will instead continue to decline while the current operates near a threshold limit. For example, an optical network transceiver device with a short expected life has a power output that approaches a lower end of the operating threshold, such as the end-of-life (EOL) power output level, of the optical network transceiver device.

In some embodiments, the device temperature of an optical network transceiver device is monitored. For example, instead of relying on the limited accuracy of temperature sensors placed in limited locations throughout a room housing an optical network transceiver device, such as a data center, the temperature of the transceiver device may be monitored using a high-resolution temperature sensor on the device itself. For example, an optical network transceiver device includes a high-resolution temperature sensor to monitor the operating temperature of the optical network transceiver device. In some embodiments, as the temperature of the device increases, the amount of current must increase to maintain the same output power. For example, as the temperature in the data center rises, the temperature of the optical network transceiver device also increases. As the device temperature increases, the output power decreases. In response to the decrease in output power, the amount of current is increased in an attempt to stabilize the output power. A fluctuation in the temperature typically corresponds to fluctuations in output power and current.

In various embodiments, the fluctuations of the monitored operating parameters are used to determine the expected life of the device. For example, in various embodiments, based at least in part on a detected fluctuation in at least one of the amount of current provided to the laser diode, the power output of the optical network transceiver device, and the device temperature of the optical network transceiver device, the expected life of the optical network transceiver device is dynamically adjusted. For example, fluctuations in the temperature of a device will impact the expected life of the optical network transceiver device. As the number of fluctuations increase, the expected life of the device decreases. As another example, in the event the current of an optical network transceiver device reaches a threshold limit, such as a current saturation limit, the monitored power output continues to drop towards the end-of-life (EOL) power output level, and repeated fluctuations in device temperature are detected, the life of the optical network transceiver device may be determined to be short, e.g., on the order of one to three weeks before failing.

In various embodiments, the expected life of the optical network transceiver device is dynamically adjusted as the operating parameters are monitored. Based on the determined life, the device can be replaced and/or more closely monitored. Replacement of the optical network transceiver device prior to failure avoids the lengthy downtime that will be incurred if not replaced and allowed to continue operating in the network environment until failure. In some embodiments, an alarm is triggered in the event a short expected life is dynamically determined. For example, an alarm indicating a near-term failure is displayed in a monitoring dashboard of a monitor device, such as a network server for monitoring network health. Based on the alarm, the soon-to-fail optical network transceiver device is identified and can be proactively replaced.

FIG. 1 is a block diagram illustrating an example of a network environment for predicting the failure of an optical network transceiver device. In the example shown, network environment 100 includes server rack 101, top of the rack (TOR) switch 111, fabric switch 121, and spine switch 131. TOR switch 111, fabric switch 121, and spine switch 131 are communicatively connected via optical network connections 113 and 123, respectively, as shown. Spine switch 131 is communicatively connected to another network equipment (not shown) via optical network connections 133. Server rack 101 includes one or more servers and is communicatively connected to TOR switch 111 via network connections 103. For example, in some embodiments, server rack includes multiple servers for providing network applications such as an online social networking application. Servers of server rack 101 are connected to TOR switch 111 via network connections 103. In some embodiments, server rack 101 includes TOR switch 111 mounted in the same rack and above one or more servers. In various embodiments, network connections 103 are direct attach copper (DAC) cable connections between servers of server rack 101 and TOR switch 111. In some embodiments, network connections 103 are one or more network connections between servers of server rack 101 and TOR switch 111 using DAC cables or other appropriate connections. In various embodiments, one or more optical network transceiver devices (not shown) are utilized for optical network connections 113, 123, and 133. In various embodiments, the optical network transceiver devices of optical network connections 113, 123, and 133 are configured to perform the process described with respect to FIG. 5 to determine the expected life of the optical network transceiver devices.

In the example shown, TOR switch 111 includes optical network interfaces 115 and server network interfaces 117. In various embodiments, server network interfaces 117 include one or more network interfaces to connected to server rack 101 via network connections 103. In some embodiments, server network interfaces 117 utilize direct attach copper (DAC) cable connections. In the example shown, optical network interfaces 115 of TOR switch 111 are utilized to connect to fabric switch 121 via optical network connections 113. In various embodiments, TOR switch 111 utilizes multiple network interfaces including both optical and non-optical network interfaces. In various embodiments, optical network interfaces 115 of TOR switch 111 utilize one or more optical transceiver network devices (not shown) and optical network connections 113 include one or more 100-gigabit optical network connections compatible with the CWDM4 Lite standard. In some embodiments, optical network connections 113 are fiber cables with a maximum length of 500 meters. In some embodiments, optical network connections 113 support a length up to 2 kilometers. In various embodiments, TOR switch 111 includes multiple network interfaces including 32 total ports with four optical links and 28 non-optical links. For example, in one embodiment, TOR switch 111 includes four ports each utilizing an optical network transceiver device and is connected to four ports of fabric switch 121. The 28 non-optical links are connected to up to 28 servers of server rack 101 via DAC connections. In some embodiments, in the event one of the four optical links of optical network connections 113 fails, the remaining three connections are able to route around the failed link. Although able to route around the failure, the failure results in increased power consumption, additional troubleshooting, reduced throughput, and a delay in re-routing the connection, among other issues.

In various embodiments, fabric switch 121 includes multiple optical network interfaces (not shown). For example, in one embodiment, fabric switch 121 is a 128-port optical interconnect switch. In the example shown, fabric switch 121 is connected to spine switch 131 via optical network connections 123. In some embodiments, spine switch 131 is a 128-port optical interconnect switch. In various embodiments, spine switch 131 is connected to additional networking equipment, such as one or more additional optical switches, via optical network connections 133. In various embodiments, with the exception of optical network connections 133, components of FIG. 1, e.g., server rack 101, TOR switch 111, fabric switch 121, and spine switch 131, all reside in the same network data center and optical network connections 133 are network connections that terminate at a different data center.

In various embodiments, the ambient temperature of network environment 100 is monitored using temperature sensors (not shown) placed at locations throughout the network environment. The ambient temperature reflects the temperature of the network environment as measured by the ambient temperature sensors and does not accurately reflect the local temperature at any one specific network device, such as the local temperature and/or operating temperature of each optical network transceiver device utilized in the network environment. For example, a data center may be configured to operate at a target ambient temperature not to exceed 35 degrees Celsius. However, the local temperature at any particular optical network transceiver device may reach a temperature much higher than 35 degrees Celsius (e.g., reaching upwards of 60 degrees Celsius) despite the ambient temperature never exceeding 35 degrees Celsius. For example, an optical network transceiver device may have a operating temperature of 62 degrees Celsius while the data center the optical network transceiver device is installed in has an ambient temperature of 42 degrees Celsius. The temperature difference is due in part to the limited number and placement locations of the temperature sensors in the network environment and the limited goal of maintaining the network environment's ambient temperature. In various embodiments, the ambient temperature fluctuates throughout the day and is based on the network usage patterns.

In some embodiments, the operating temperature of one or more optical network transceiver devices is monitored to maintain a narrow range of operating temperature for each optical network transceiver device. Instead of relying on the ambient temperature, a temperature measured using an optical network transceiver device is utilized. For example, the operating temperature of an optical network transceiver device is maintained to within two degrees Celsius. As another example, the operating temperature of the device does not deviate more than two degrees Celsius. In some embodiments, a configurable threshold range is utilized for maintaining the operating temperature of each optical network transceiver device.

In some embodiments, the operating temperatures of the optical network transceiver devices of a network environment are utilized for maintaining the ambient temperature of the environment. For example, in a temperature controlled network environment, the ambient temperature is adjusted based on monitoring the temperature of one or more optical network transceiver devices. Due to the lack in accuracy and sensitivity of ambient room temperature sensors, the temperature sensors of an optical network transceiver device may be used instead to dynamically adjust the ambient temperature of a network environment. In some embodiments, the temperature is adjusted based on the determined expected life of an optical network transceiver device. For example, fluctuations in the operating parameters are detected that decrease the expected life of an optical network transceiver device. In response to the adjusted expected life, the environment temperature of the network environment is adjusted to a more stable temperature. In some embodiments, the results (temperature, current, power output, expected life, etc.) of one or more optical network transceiver devices may be aggregated and used to adjust the temperature of a temperature-controlled environment. In some embodiments, a subset of optical network transceiver devices are used to monitor temperatures local to the select optical network transceiver devices, for example, the temperature associated with a particular server rack and/or switch with the installed optical network transceiver devices.

In various embodiments, the components shown in FIG. 1 may exist in various combinations. Although single instances of components have been shown to simplify the diagram, additional instances of any of the components shown in FIG. 1 may exist for a network environment. For example, one or more additional switches, routers, network connections, fiber and/or Ethernet connections, etc. may exist for providing network functionality. For example, in some embodiments, network environment 100 includes one or more additional switches and/or routers for establishing a network connection to another data center. Components not shown in FIG. 1 may also exist.

Figure 2:
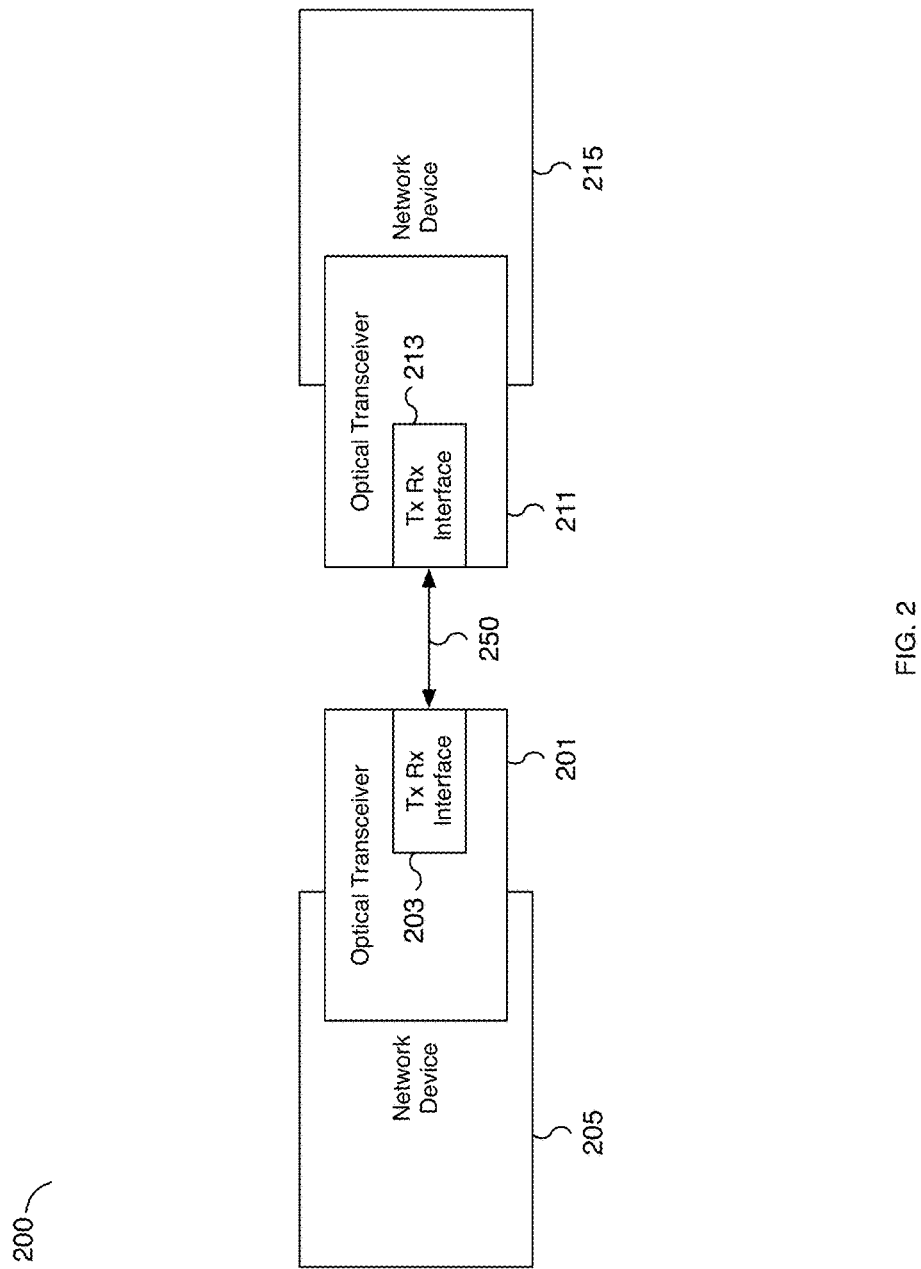
FIG. 2 is a block diagram illustrating an example of a network environment for predicting the failure of an optical network transceiver device.

FIG. 2 is a block diagram illustrating an example of a network environment for predicting the failure of an optical network transceiver device. In the example shown, network environment 200 includes two optical network transceiver devices 201 and 211 that are connected via optical network connection 250. In some embodiments, optical network connection 250 is a single-mode fiber cable. Each of optical network transceiver devices 201 and 211 includes an optical Tx Rx interface for transmitting and receiving optical signals. Optical network transceiver device 201 includes optical Tx Rx interface 203 and optical network transceiver device 211 includes optical Tx Rx interface 213. Optical network transceiver devices 201 and 211 utilize optical Tx Rx interface 203 and optical Tx Rx interface 213 to establish optical network connection 250.

In the example shown, optical network transceiver device 201 is inserted into network device 205 and optical network transceiver device 211 is inserted into network device 215. In various embodiments, network devices 205 and 215 are network switches. In some embodiments, network devices 205 and 215 are TOR switch 111, fabric switch 121, and/or spine switch 131 of FIG. 1. In some embodiments, optical network connection 250 is optical network connection 113, 123, and/or 133 of FIG. 1.

In some embodiments, optical network transceiver devices 201 and 211 utilize a Quad Small Form-factor Pluggable (QSFP) interface. In some embodiments, the interface is a QSFP+, QSFP28, or other variation of a QSFP interface. In various embodiments, optical network transceiver devices 201 and 211 are optical transceivers utilizing a QSFP, QSFP+, QSFP28, or appropriate interface. For example, optical network transceiver devices 201 and 211 may be high-speed quad-channel optical transceiver devices wherein each channel supports one or more transmitting rates. In various embodiments, the transmitting rates may range from 1 gigabit/second up to 28 gigabits/second. In some embodiments, the interface is compatible with transmitting rates reaching a rate of 100 gigabits/second per channel and/or up to 400 gigabits/second total for four channels. In various embodiments, optical Tx Rx interfaces 203 and 213 are configured to work with multiple transmitting rates including 28 gigabits/second and up to 100 gigabits/second per channel.

As described in further detail below, optical network transceiver devices 201 and 211 transmit and receive optical signals. In various embodiments, to maintain the power output of an optical signal travelling over optical network connection 250, a current of optical network transceiver devices 201 and 211 is adjusted based on feedback from monitoring the transmitting power output. For example, in response to the power output of an optical network transceiver device dropping, the amount of current for the device is increased to stabilize the power output. In some embodiments, as the operating temperature of optical network transceiver devices 201 and 211 increase, their respective transmitting power outputs decrease and require an increase in current to stabilize their power outputs. In various embodiments, the optical network transceiver device monitors the power output in order to adjust the current. For example, in some embodiments, an optical network transceiver device includes a tap monitor powering module to monitoring transmitting power output.

Figure 3:
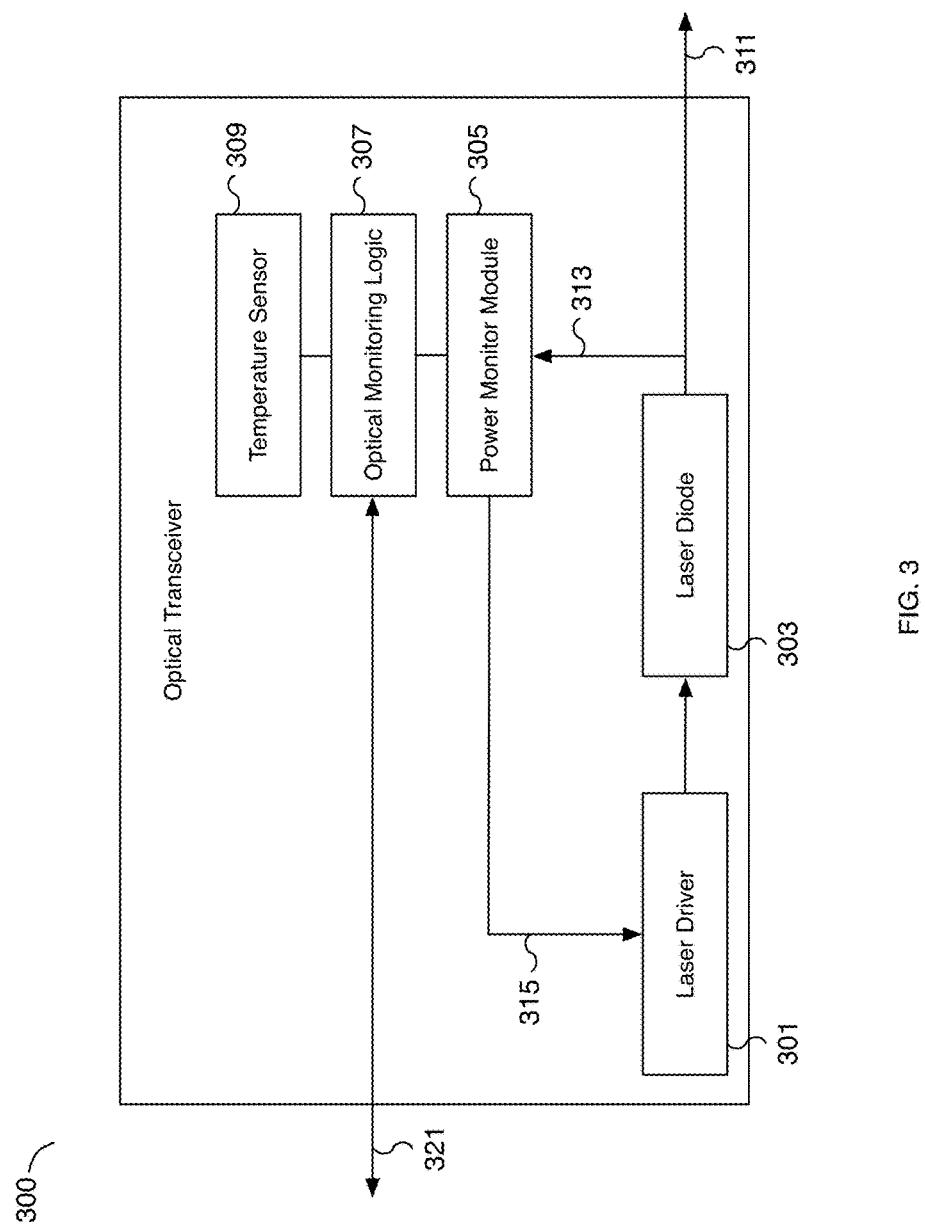
FIG. 3 is a functional diagram illustrating an embodiment of an optical network transceiver device.

FIG. 3 is a functional diagram illustrating an embodiment of an optical network transceiver device. In various embodiments, optical network transceiver device 300 is utilized to dynamically adjust the determined expected life of the device. In the example shown, optical network transceiver device 300 includes laser driver 301, laser diode 303, power monitor module 305, optical monitoring logic 307, and temperature sensor 309. Laser driver 301 delivers an amount of current to laser diode 303 necessary to generate optical transmission output signal 311. In various embodiments, power monitor module 305 monitors the power output of optical network transceiver device 300. For example, power monitor module 305 monitors the magnitude of optical transmission output signal 311 via power monitor signal 313. In various embodiments, power monitor signal 311 is proportional to optical transmission output signal 311. In various embodiments, power monitor module 305 is implemented using a TAP monitor powering module. In some embodiments, the TAP monitor powering module is calibrated to increase the sensitivity of the monitoring. In the example shown, temperature sensor 309 is utilized to monitor the operating temperature of optical network transceiver device 300.

In the example shown, power monitor module 305 sends loopback signal 315 to laser driver 301. Based on loopback signal 315, laser driver 301 will adjust the amount of current to feed laser diode 303. In various embodiments, loopback signal 315 is controlled by optical monitoring logic 307. In various embodiments, optical monitoring logic 307 is implemented using firmware (not shown) of optical network transceiver device 300. In some embodiments, optical monitoring logic 307 is implemented as a digital optical monitoring chip. For example, in some embodiments, optical monitoring logic 307 is implemented using an optical monitoring integrated circuit. In the example shown, communication channel 321 is utilized to communicate with optical monitor logic 307. For example, a full-rate inter-integrated circuit (I2C) communication protocol may be utilized to retrieve the power output of optical network transceiver device 300 via communication channel 321. In various embodiments, optical network transceiver device 300 includes an electrically erasable programmable read-only memory (EEPROM) (not shown) that may be accessed via communication channel 321. In some embodiments, the EEPROM is utilized to store information of optical network transceiver device 300 including data such as transmission power (e.g., power output), current, temperature, supplier, version, serial number, and/or vendor information.

In some embodiments, optical monitoring logic 307 is utilized with temperature sensor 309 to continuously monitor the temperature of the optical network transceiver device. In various embodiments, temperature sensor 309 is a high-resolution temperature sensor capable of far more accurate readings than temperature sensors placed at locations through the network environment. In some embodiments, the ambient temperature is the ambient temperature of the network environment of optical network transceiver device 300. In various embodiments, the ambient temperature is based on temperature sensors placed at locations throughout the network environment, such as a datacenter, and does not accurately reflect the local temperature of optical network transceiver device 300. In some embodiments, temperature sensor 309 is calibrated to detect operating temperature changes of 1 degree Celsius or less. For example, conventional temperature sensors may be calibrated according to a specification that requires only detecting changes greater than +/−3 degrees Celsius. Unlike conventional optical network transceiver device temperature sensors, temperature sensor 309 is calibrated to monitor the temperature of optical network transceiver device 300 with greater accuracy and sensitivity. For example, in various embodiments, temperature sensor 309 detects temperature changes of +/−1 degree Celsius. In some embodiments, temperature sensor 309 detects temperature changes less than +/−1 degree Celsius. In various embodiments, the operating temperature of an optical network transceiver device should not exceed an operating temperature limit such as 55 degrees Celsius. For example, an operating temperature of 60 degrees Celsius results in a failed link. In various embodiments, the temperature of the optical network transceiver device should be maintained within an operating range, for example, between 15 and 55 degrees Celsius. In some embodiments, a more narrow range of operating temperature is used.

In some embodiments, communication channel 321 is utilized to read data of optical network transceiver device 300, such as current, power output, and temperature information. For example, current, power, and temperature information is retrieved from optical network transceiver device 300 via communication channel 321 and provided to a network monitoring device, such as a network monitoring server running a monitoring dashboard. In various embodiments, the dashboard includes information of optical network transceiver device 300 including its operating parameters such as current, power output, device temperature, serial number, version, vendor, etc.

In various embodiments, optical network transceiver device 300 attempts to maintain a constant or near-constant power output by monitoring optical transmission output signal 311 via power monitor signal 313. For example, in response to optical transmission output signal 311 dropping, optical monitoring logic 307 signals laser driver 315 to increase the amount of current using loopback signal 315. By increasing current, typically, the power output will also increase. In the event that the power output does not respond to an increase in current (e.g., optical transmission output signal 311 does not stabilize but instead continues to decrease), optical monitoring logic 307 may predict that optical network transceiver device 300 has a high likelihood of failing in the near term. In various embodiments, the prediction results are used to dynamically determine and adjust an expected life. For example, in the event the power output continues to drop, in some scenarios the device is likely to fail within the next 3 weeks and has an expected life of approximately 3 weeks. In some embodiments, a change in the expected life such as a determined expected life resulting in a near-term failure for optical network transceiver device 300 results in generating a maintenance ticket and/or troubleshooting task for the particular device and/or a request to replace the device.

In some embodiments, optical network transceiver device 300 attempts to maintain a power output within an operating range between beginning-of-life (BOL) and end-of-life (EOL) levels. For example, an operating range may be approximately 6 dB for the transmission power output with a BOL level of approximately 0 decibel-milliwatts (dBm) and an EOL level of approximately −6 dBm. In response to a power output drop (e.g., from 0 dBm to −3 dBm), power monitor module 305 identifies the change in power output and optical monitoring logic 307 directs laser driver 301 to increase the amount of current using loopback signal 315. In a correctly functioning optical network transceiver device, power output will stabilize. However, in the event the power output does not stabilize and continues to drop, the amount of current is increased until it approaches a saturation threshold. For example, in various embodiments, a saturation threshold is a current level of approximately 65 mA. In some embodiments, the saturation threshold is dependent on the vendor and/or model of optical network transceiver device 300. In the event the current is increased to a threshold, such as one approximating the saturation threshold, and power output continues to drop, optical monitoring logic 307 predicts the likelihood of optical network transceiver device 300 failing in the near-term is very high. In various embodiments, optical monitoring logic 307 predicts laser diode 303 has a high likelihood of failing within three weeks and adjusts the determined expected life appropriately. In some embodiments, optical monitoring logic 307 and power monitoring module 305 monitor the slope or rate of change of optical transmission output signal 311 to predict the failure of laser diode 303. In some embodiments, a threshold is detected based on the saturation threshold and triggers the prediction of a high likelihood of a near-term failure of optical network transceiver device 300. For example, in some embodiments, a drop of 2 dBm is sufficient to adjust the determined expected life and to trigger a failure warning for optical network transceiver device 300. In some embodiments, a drop of ⅓ of the range of the operating power output threshold is sufficient adjust the determined expected life and to trigger a failure warning for optical network transceiver device 300. For example, if the operating threshold is approximately 6 dB, then a drop of 2 dB is sufficient to dynamically adjust the determined expected life downwards and trigger a failure warning for optical network transceiver device 300. In various embodiments, an adjusted determined life is treated as an indicator and/or warning and not as a device failure.

In some embodiments, in the event the amount of current reaches a saturation threshold but the power output is within operating specifications, optical monitoring logic 307 predicts the likelihood of optical network transceiver device 300 failing in the near-term (i.e., within several weeks) is low but that the likelihood of optical network transceiver device 300 failing in the long-term (i.e., in one year's timeframe) is high. For example, in the event the amount of current is increased to the saturation threshold and the power output stabilizes, optical monitoring logic 307 predicts the likelihood of optical network transceiver device 300 will fail in a year is high and likely has a remaining lifespan of approximately a year. Based on the predicted long-term failure, the expected life is determined accordingly, for example, an expected life is dynamically adjusted to approximately one year.

In various embodiments, the expected life of an new optical network transceiver device is approximately 20 years. In some scenarios, an optical network transceiver device may be deployed for approximately five years before being replaced based on circumstances other than expected life. However, depending on the operating temperature, the expected life of an optical network transceiver device can be significantly reduced. For example, fluctuations in operating temperature will reduce the lifespan of an optical network transceiver device. As shown below with respect to FIG. 4, fluctuations in operating temperature are typically associated with corresponding fluctuations in both current and power output. The number, magnitude, and length of the fluctuations impact the life of an optical network transceiver device. In some embodiments, the oscillations reduce the useful life of an optical network transceiver device.

In various embodiments, operating parameters including current, power output, and temperature are monitored for the lifespan of an optical network transceiver device. Measurements of the parameters, including the fluctuations and oscillations of the current, power output, and temperature are measured. The count, magnitude, and length of the fluctuations are also measured. In various embodiments, the measurements are based on a time interval that may be configurable. For example, the time interval for detecting fluctuations impacts the size of the fluctuations that can be detected. In some embodiments, data based on the number of fluctuations is utilized to determine a predicted expected life of optical network transceiver device 300. For example, the monitored data is used to determine an expected life based on data collected from other optical network transceiver devices that have experienced similar fluctuations. In some embodiments, the output signal of optical network transceiver device 300 is monitored as well to determine whether the signal is valid at certain temperatures. In some embodiments, the output signal is invalidated in response to the temperature of optical network transceiver device 300 exceeding a threshold. In some embodiments, the output signal is invalidated based on detected fluctuations that exceed a threshold amount. For example, based on monitored data collected from multiple optical network transceiver devices of the same vendor, the output signal of optical network transceiver device with the same vendor and/or model is determined invalid based on the number of fluctuations detected.

In various embodiments, optical network transceiver device 300 includes four laser diodes (not shown). In some embodiments, the four laser diodes each operate with a unique wavelength (e.g., 1271 nm, 1291 nm, 1311, and 1331 nm) with a gap between each wavelength (e.g., 20 nm). In some embodiments, a single laser driver is utilized to drive more than one laser diode. In various embodiments, in the event any one of the laser diodes fails, the entire optical link fails.

In various embodiments, optical network transceiver device 300 is optical network transceiver device 201 and/or optical network transceiver device 211 of FIG. 2. In various embodiments, optical transmission output signal 311 is an optical signal carried over an optical network connection such as optical network connection 113, 123, and/or 133 of FIG. 1 and/or optical network connection 250 of FIG. 2.

Figure 4:
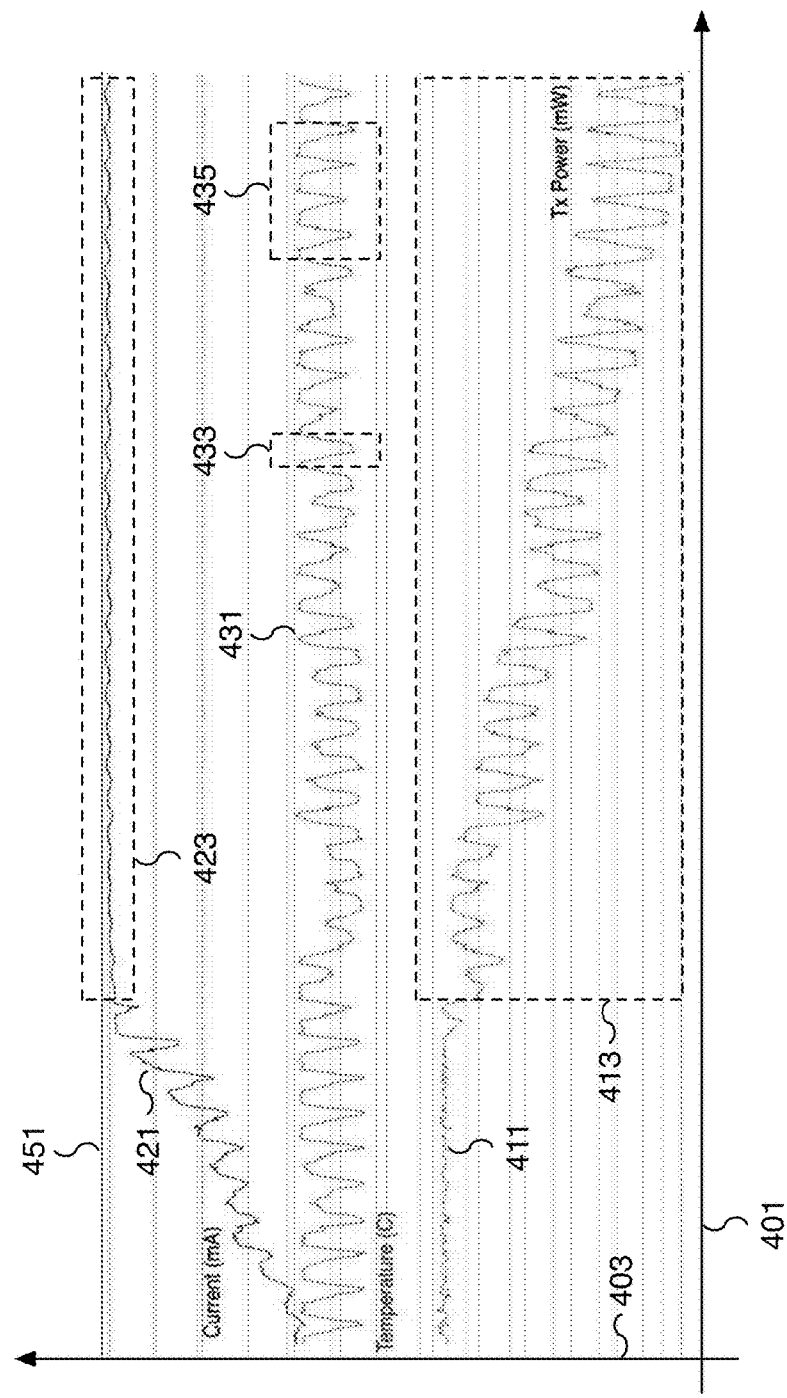
FIG. 4 is a graph illustrating an example of current, temperature, and power output over time for an embodiment of an optical network transceiver device.

FIG. 4 is a graph illustrating an example of current, temperature, and power output over time for an embodiment of an optical network transceiver device. The graph of FIG. 4 depicts transmission output power measurements 411, current measurements 421, and temperature measurements 431 over time. X-axis 401 is a measurement of time and Y-axis 403 is a measurement of milliwatts (mW) for transmission output power measurements 411, milliamps (mA) for current measurements 421, and Celsius (C) for temperature measurements 431. Maximum current level 451 represents a maximum operating current that can be all applied to a laser diode of an optical network transceiver device. For example, a current saturation threshold is based on maximum current level 451.

In various embodiments, the graph of FIG. 4 depicts the operation of an optical network transceiver device such as optical network transceiver device 300 of FIG. 3. In some embodiments, current measurements 421 are the amount of current used to drive a laser diode by a laser driver, such as laser diode 303 by laser driver 301 of FIG. 3, and transmission output power measurements 411 is a measurement of optical transmission output signal 311 by optical monitoring logic 307 and power monitor module 305 using power monitor signal 313 of FIG. 3. In some embodiments, temperature measurements 431 are temperature measurements taken using a temperature sensor such as temperature sensor 309 of FIG. 3.

In the graph of FIG. 4, current measurements 421 depict a trend of increasing the amount of current applied to the laser diode of the optical network transceiver device. Current region 423, corresponding to the region of current measurements 421 within the dotted rectangle, depicts the period of time where the current applied to optical network transceiver device is at a saturation threshold. For example, during the time represented by current region 423, the amount of current used by the laser diode of the optical network transceiver device is at a maximum operating level.

The graph of FIG. 4 also depicts a trend of minor fluctuations of transmission output power measurements 411 with a region having a stable power output followed by region with a trend of a steady drop in the power output. Power output region 413, corresponding to the region of transmission output power measurements 411 within the dotted rectangle, depicts the period of time where the current applied to optical network transceiver device is at a saturation threshold yet the power output does not stabilize and continues a trend of declining. For example, during the time represented by power output region 413, the amount of current used by the laser diode of the optical network transceiver device is at a maximum operating level but the value of the transmission output power continues to overall decline.

The graph of FIG. 4 also depicts a trend of temperature fluctuations of temperature measurements 431. Temperature region 433, corresponding to the region of temperature measurements 431 within the dotted rectangle, depicts a single cycle of a temperature fluctuation. Temperature region 435, corresponding to the region of temperature measurements 431 within the dotted rectangle, depicts four cycles of a temperature fluctuation. As shown in the graph of FIG. 4, the fluctuations in temperature correspond to similar fluctuations in both output power and current. For example, a fluctuation detected among temperature measurements 431 corresponds to a fluctuation in output power measurements 411 and current measurements 421. In some embodiments, the optical monitoring logic of the optical network transceiver device detects fluctuations in the measured operating parameters such as temperature, current, and/or output power fluctuations. In some embodiments, a monitoring server detects fluctuations in the measured operating parameters such as temperature, current, and/or output power fluctuations by retrieving the monitored values from the optical network transceiver device.

In various embodiments, a power monitor module is used to detect when an optical network transceiver device enters a condition represented in FIG. 4 by a declining power output region such as power output region 413 with a corresponding region such as current region 423 where the amount of current is at a threshold amount. In response to the detected conditions, an optical monitoring logic is used to predict a high likelihood of a near-term failure of the optical network transceiver device. In some embodiments, the detection triggers an alarm and/or displays measurement information using a monitoring device such as a network monitoring station.

Figure 5:
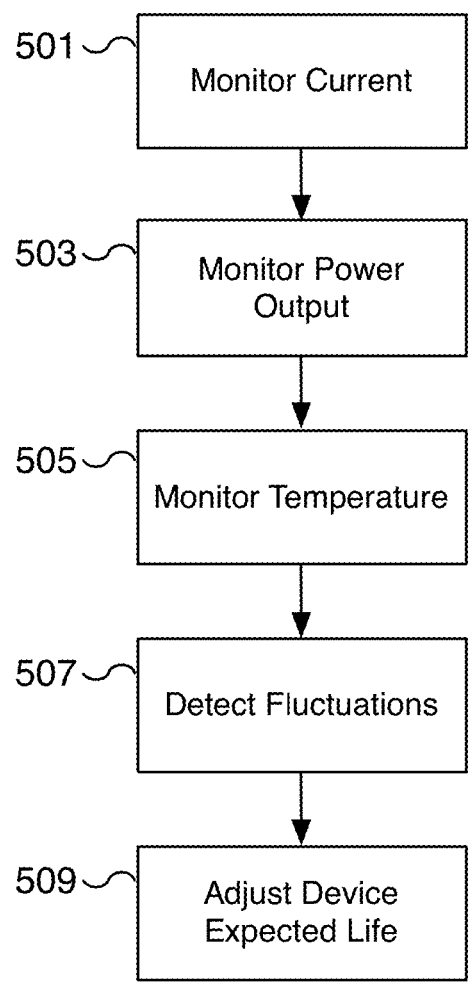
FIG. 5 is a flow diagram illustrating an embodiment of a process for dynamically adjusting a determined expected life of the optical network transceiver device.

FIG. 5 is a flow diagram illustrating an embodiment of a process for dynamically adjusting a determined expected life of the optical network transceiver device. The process of FIG. 5 may be utilized in a network environment to reduce the downtime of a network environment by preemptively replacing optical network transceiver devices that have a short determined life, for example, a life of less than several weeks. In some embodiments, the process of FIG. 5 is performed using optical network transceiver device(s) in network environment 100 of FIG. 1, optical network transceiver devices 201 and 211 of FIG. 2, and optical network transceiver device 300 of FIG. 3. In some embodiments, the process of FIG. 5 is performed using a processor of a monitoring server to dynamically adjusting a determined expected life of the optical network transceiver device.

At 501, the amount of current driving a laser diode of an optical network transceiver device is monitored. In some embodiments, a power monitor module controlled by optical monitoring logic is used to monitor the amount of current. In some embodiments, the power monitor module is power monitor module 305 of FIG. 3 and optical monitoring logic is optical monitoring logic 307 of FIG. 3. In some embodiments, the monitoring is performed using a digital optical monitoring chip on an optical network transceiver device. In some embodiments, the amount of current is monitored by monitoring a laser driver and/or the loopback signal received by a laser driver. In some embodiments, the laser driver is laser driver 301 of FIG. 3 and the loopback signal is loopback signal 315 of FIG. 3. In some embodiments, the current level is read from an electrically erasable programmable read-only memory (EEPROM) of the optical network transceiver device.

In various embodiments, at 501, the absolute level of the current is monitored and compared to a threshold level. For example, the amount of current is monitored and compared to a threshold level based on a maximum operating current level of an optical network transceiver device. In some embodiments, the maximum current level is based on the model of the optical network transceiver device and/or the vendor. In some embodiments, the maximum current level is depicted in FIG. 4 as maximum current level 451. In some embodiments, the maximum current level is a saturation current level. In various embodiments, the saturation current level is vendor and/or model specific.

At 503, the power output of the optical network transceiver device is monitored. In various embodiments, a power monitor module controlled by optical monitoring logic is used to monitor the transmitting power output. In some embodiments, the power monitor module is power monitor module 305 of FIG. 3 and optical monitoring logic is optical monitoring logic 307 of FIG. 3. In some embodiments, the monitoring is performed using a digital optical monitoring chip on an optical network transceiver device. In some embodiments, the monitoring is performed by tapping the optical transmission output signal of the device. For example, a power monitor signal such as power monitor signal 313 of FIG. 3 is utilized to monitor the output power of the optical network transceiver device.

In various embodiments, the slope and/or the rate of change of the power output is monitored. In some embodiments, the change in power output compared to an operating range is monitored. For example, the change in the transmission power output of an optical network transceiver device is monitored to detect drops that exceed ⅓ of the operating range for the power output. In some embodiments, the monitoring utilizes a power output threshold that is based on an end-of-life (EOL) measurement for the optical network transceiver device. In some embodiments, the monitoring of the power output includes determining a power output threshold based on a range calculated using a beginning-of-life (BOL) measurement and an end-of-life (EOL) measurement for the optical network transceiver device. For example, the power output is monitored for a drop exceeding a threshold based on a percentage of the range calculated using the difference between the BOL and EOL levels. In various embodiments, the monitoring of the power output includes reading a power output measurement from an electrically erasable programmable read-only memory (EEPROM) data corresponding to the optical network transceiver. For example, a full-rate inter-integrated circuit (I2C) communication protocol may be utilized to retrieve the power output of optical network transceiver device.

At 505, the device temperature of the optical network transceiver device is monitored. In various embodiments, an optical monitoring logic interfaces with a temperature sensor to monitor the device's operating temperature. In some embodiments, the optical monitoring logic is optical monitoring logic 307 of FIG. 3 and the temperature sensor is temperature sensor 309 of FIG. 3. In some embodiments, the monitoring is performed using a digital optical monitoring chip on an optical network transceiver device. In various embodiments, the temperature sensor is a high-resolution temperature sensor capable of measuring the temperature accurately to within +/−1 degree Celsius. In some embodiments, the device temperature is read from an electrically erasable programmable read-only memory (EEPROM) of the optical network transceiver device.

At 507, fluctuations based on the operating parameters are detected. For example, fluctuations of the amount of current monitored at 501, the power output monitored at 503, and the temperature monitored at 505 are detected. In some embodiments, the number of fluctuations for one or more of the parameters is detected. For example, the number of temperature fluctuations is detected. In some embodiments, the magnitude, length, and count of the detected fluctuations are determined. In some embodiments, a count of the number of oscillations for each type of fluctuations is determined. In various embodiments, the fluctuations may be detected over a pre-determined interval, such as a configurable period of time. In some embodiments, a monitoring server retrieves the values monitored at the steps 501, 503, and 505 using a using a full-rate inter-integrated circuit (I2C) communication protocol from electrically erasable programmable read-only memory (EEPROM) of the optical network transceiver device to detect fluctuations of the monitored values.

At 509, the expected life of the optical network transceiver device is dynamically adjusted. In various embodiments, the expected life is adjusted based on the at least in part on the fluctuations detected at 507. For example, fluctuations in the device temperature are utilized to reduce the expected life of the device. In some embodiments, the magnitude, length, and count of fluctuations are utilized to dynamically adjust the expected life. For example, as the temperature of the optical network transceiver device increases, the transmitting power output decreases. In response to the decrease in output power, the amount of current is increased in an attempt to stabilize the output power. A fluctuation in the temperature typically corresponds to fluctuations in output power and current. The magnitude, length, and count of fluctuations may be used to reduce the expected life of the device.

In various embodiments, the determined expected life is based on the likelihood of failure of the optical network transceiver device and may be based on the current exceeding a threshold at 501, the monitored power output at 503, and the monitored temperature at 505. In some embodiments, the prediction of a high likelihood of a near-term failure of the optical network transceiver device is triggered in the event of a drop greater than a power output decrease threshold. For example, a high likelihood of a near-term failure is predicted in the event the power output decreases beyond a threshold of 2 dBm. In some embodiments, the power output decrease threshold is based on a percentage of the intended operating range of the device. For example, in some embodiments a drop equal to or greater than ⅓ of the range of the operating power output is sufficient to trigger a failure warning for the optical network transceiver device. In some embodiments, the prediction is based on the rate of change and/or slope of the change of the power output. In various embodiments, the threshold may be dependent on the vendor and/or model of the optical network transceiver device.

In some embodiments, the prediction includes identifying a first stage with a likelihood of a long-term failure (i.e., predicted failure in approximately a year) and a second stage with a likelihood of a near-term failure (i.e., predicted failure within the next several weeks). In response to a prediction of a high likelihood of a long-term failure, the expected life of the device is adjusted accordingly and the device can be monitored on a regular basis and replaced at a time nearing the expected long-term failure date. In response to a prediction of a high likelihood of a short-term failure, the expected life of the device is adjusted accordingly and the device can be monitored for expedited replacement and/or replaced immediately.

In various embodiments, the results of the monitoring performed by the process of FIG. 5 are regularly displayed on a monitoring device such as a network monitoring server. In some embodiments, the monitored values and the determined expected life are displayed on a dashboard. For example, a software dashboard provides a user interface for monitoring the status of the network environment and includes status information of one or more optical network transceiver devices and each device's dynamically determined expected life. Alerts based on the adjusted expected life may be sent to and/or generated by the monitoring equipment. For example, an alert may be sent when the expected life is adjusted and/or in response to a change in the expected life that exceeds a configurable threshold. In some embodiments, an alert will trigger a ticket and/or maintenance request to inspect the optical network transceiver device associated with the alert. In some embodiments, the alert identifies the optical network transceiver device using a device identifier and includes information on the detected fluctuations, such as the magnitude, length, and count of the detected fluctuations. In some embodiments, a count of the number of oscillations for each type of fluctuations is included.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    monitoring an amount of current provided to a laser diode of an optical network transceiver device;
    monitoring a power output of the optical network transceiver device;
    monitoring a device temperature of the optical network transceiver device; and
    based at least in part on a detected number of oscillations in at least one type of fluctuation within a specified period of time in at least one of the amount of current provided to the laser diode, the power output of the optical network transceiver device, and the device temperature of the optical network transceiver device, dynamically adjusting a determined expected life of the optical network transceiver device.

2. The method of claim 1, further comprising triggering an alert in response to a change in the determined expected life of the optical network transceiver device.

3. The method of claim 2, wherein the alert identifies an optical network transceiver device.

4. The method of claim 3, wherein the alert identifies a source of the detected oscillation.

5. The method of claim 3, wherein the alert is displayed at a monitoring device.

6. The method of claim 5, wherein the monitoring device is a network dashboard.

7. The method of claim 1, wherein the specified period of time is configurable.

8. The method of claim 1, wherein monitoring the device temperature includes monitoring the number, magnitude, and length of oscillations of the device temperature.

9. The method of claim 1, further comprising associating a temperature fluctuation with a current fluctuation or a power output fluctuation.

10. The method of claim 1, further comprising adjusting an ambient temperature of a network environment of the optical network transceiver device based on the device temperature of the optical network transceiver device.

11. The method of claim 1, wherein the monitoring of the device temperature utilizes a temperature sensor inside the optical network transceiver device.

12. The method of claim 11, wherein the temperature sensor is calibrated to detect a change of less than 1 degree Celsius.

13. The method of claim 1, further comprising invalidating an output signal of the optical network transceiver device based on the device temperature.

14. The method of claim 1, further comprising invalidating an output signal of the optical network transceiver device based on the detected oscillation.

15. The method of claim 1, wherein the device temperature of the optical network transceiver device is more precise than a measured ambient temperature of a network environment of the optical network transceiver device.

16. The method of claim 1, wherein the monitoring of the device temperature includes reading a temperature measurement from an electrically erasable programmable read-only memory (EEPROM) data corresponding to the optical network transceiver.

17. The method of claim 1, wherein the monitoring of the device temperature utilizes a full-rate inter-integrated circuit (I2C) communication protocol for retrieving the device temperature from an electrically erasable programmable read-only memory (EEPROM) of the optical network transceiver.

18. A system, comprising:
a processor; and
a memory coupled with the processor, wherein the memory is configured to provide the processor with instructions which when executed cause the processor to:
   monitor an amount of current provided to a laser diode of an optical network transceiver device;
   monitor a power output of the optical network transceiver device;
   monitor a device temperature of the optical network transceiver device; and
   dynamically adjust a determined expected life of the optical network transceiver device based at least in part on a detected number of oscillations in at least one type of fluctuation within a specified period of time in at least one of the amount of current provided to the laser diode, the power output of the optical network transceiver device, and the device temperature of the optical network transceiver device.

19. A method, comprising:
monitoring an amount of current provided to a plurality of laser diode optical network transceiver devices;
monitoring a power output of the plurality of optical network transceiver devices;
monitoring a device temperature of the plurality of optical network transceiver devices;
detecting oscillations for each of the plurality of optical network transceiver devices based at least in part on at least one of the amount of current provided to each of the plurality of laser diode optical network devices, the power output of each of the plurality of laser diode optical network devices, and the device temperature of each of the plurality of laser diode optical network devices;
dynamically adjusting a determined expected life of each of the plurality of optical network transceiver devices based on a number of the detected oscillations within a specified period of time; and
displaying the detected oscillations on a monitoring device.

20. The method of claim 19, further comprising:
aggregating a subset of the detected oscillations; and
adjusting an ambient temperature within a configurable operating range for a network environment of the plurality of optical network transceiver devices based on the subset of detected oscillations.

* * * * *